United States Patent
Schoellkopf

(10) Patent No.: US 11,964,619 B2
(45) Date of Patent: Apr. 23, 2024

(54) ARRANGEMENT OF A CONDUIT ON A HOUSING PART FOR A MOTOR VEHICLE

(71) Applicant: Daimler AG, Stuttgart (DE)

(72) Inventor: Bernd Schoellkopf, Uhingen (DE)

(73) Assignee: Daimler AG, Stuttgart (DE)

( * ) Notice: Subject to any disclaimer, the term of this patent is extended or adjusted under 35 U.S.C. 154(b) by 441 days.

(21) Appl. No.: 17/433,938

(22) PCT Filed: Feb. 4, 2020

(86) PCT No.: PCT/EP2020/052670
§ 371 (c)(1),
(2) Date: Aug. 25, 2021

(87) PCT Pub. No.: WO2020/173668
PCT Pub. Date: Sep. 3, 2020

(65) Prior Publication Data
US 2022/0134974 A1    May 5, 2022

(30) Foreign Application Priority Data

Feb. 26, 2019 (DE) ............... 10 2019 001 338.7

(51) Int. Cl.
*B60R 16/02* (2006.01)
*H01M 50/172* (2021.01)
(Continued)

(52) U.S. Cl.
CPC ....... *B60R 16/0215* (2013.01); *H01M 50/172* (2021.01); *H02G 3/04* (2013.01); *H02G 3/088* (2013.01)

(58) Field of Classification Search
CPC ............ H02G 3/04; H02G 3/088; H02G 3/08; H02G 3/081; H02G 3/00; H02G 15/00;
(Continued)

(56) References Cited

U.S. PATENT DOCUMENTS

| 6,077,102 A * | 6/2000 | Borzi | ............... | H01R 9/2458 439/364 |
| 6,733,345 B2 * | 5/2004 | Weise | ................. | H01R 9/24 439/721 |

(Continued)

FOREIGN PATENT DOCUMENTS

| CN | 103538456 A | 1/2014 |
| CN | 104919911 A | 9/2015 |

(Continued)

OTHER PUBLICATIONS

English-language Chinese Office Action issued in Chinese application No. 2020800124099 dated Oct. 24, 2022 (Three (3) pages).
(Continued)

*Primary Examiner* — Angel R Estrada
(74) *Attorney, Agent, or Firm* — Crowell & Moring LLP

(57) ABSTRACT

An arrangement includes a housing part for a motor vehicle and a conduit, designed to carry electric current, disposed on the housing part. A first longitudinal region of the conduit is disposed in a recess of the housing part. A seal formed from an elastomer is held on the housing part and via the seal the housing part is sealable against a housing element. A second longitudinal region of the seal extends over the first longitudinal region of the conduit such that the first longitudinal region is fixed in a positive-locking manner in the recess.

5 Claims, 5 Drawing Sheets

(51) Int. Cl.
*H02G 3/04* (2006.01)
*H02G 3/08* (2006.01)

(58) Field of Classification Search
CPC ..... B60R 16/0215; B60R 16/00; B60R 16/02; B60R 16/0207; H05K 5/00; H05K 5/02; F16J 15/064; F16J 15/106; H01M 50/172
USPC ...... 174/68.1, 50, 520, 559, 17 R, 560, 564; 220/3.2–3.9, 4.02; 248/68.1; 439/76.1, 439/76.2, 949
See application file for complete search history.

(56) References Cited

U.S. PATENT DOCUMENTS

| | | | | |
|---|---|---|---|---|
| 6,831,222 | B2* | 12/2004 | Pastuch | H02G 3/088 |
| | | | | 174/58 |
| 7,208,678 | B2* | 4/2007 | Shinmura | H05K 7/20927 |
| | | | | 439/76.1 |
| 7,259,337 | B1* | 8/2007 | Gretz | H02G 3/06 |
| | | | | 220/241 |
| 7,446,266 | B1* | 11/2008 | Gretz | H02G 3/083 |
| | | | | 220/241 |
| 7,845,959 | B2* | 12/2010 | Czyz | B60R 16/0238 |
| | | | | 439/76.2 |
| 8,338,720 | B2* | 12/2012 | Burgi | H05K 5/0073 |
| | | | | 174/541 |
| 8,942,001 | B2* | 1/2015 | Kawai | H05K 5/0052 |
| | | | | 361/728 |
| 9,035,201 | B2* | 5/2015 | Jones | H02G 3/185 |
| | | | | 174/487 |

FOREIGN PATENT DOCUMENTS

| | | |
|---|---|---|
| DE | 103 38 664 A1 | 3/2005 |
| DE | 103 56 763 A1 | 7/2005 |
| DE | 10 2016 114 453 A1 | 2/2018 |
| EP | 2 042 786 A1 | 4/2009 |
| EP | 2 432 043 B1 | 3/2012 |
| WO | WO 2011/000363 A1 | 1/2011 |

OTHER PUBLICATIONS

PCT/EP2020/052670, International Search Report dated Mar. 27, 2020 (Three (3) pages).
Dr. Juergen Engbring, "Der Weg zum optimalen HV-Bordnetz", Feb. 1, 2012, URL: http:/www.leoni-electromobility.com/fileadmin/bu/emo/fachartikel/120999_E-Mobility_Der-Weg-zum-optimalen-Bordnetz_final.pdf, pp. 40-43, XP055161535.
German-language European Office Action issued in European application No. 20 704795.2-1108 dated Apr. 29, 2022 (Four (4) pages).
German-language German Office Action issued in German application No. 10 2019 001 338.7 dated Nov. 9, 2021 (Five (5) pages).

* cited by examiner

ARRANGEMENT OF A CONDUIT ON A HOUSING PART FOR A MOTOR VEHICLE

BACKGROUND AND SUMMARY OF THE INVENTION

The invention relates to an arrangement of a conduit on a housing part for a motor vehicle.

EP 2 432 043 B1 discloses an arrangement having a sealing frame for use in a battery.

The object of the present invention is to create an arrangement of a conduit on a housing part for a motor vehicle, such that the conduit can be fixed to the housing part in a particularly simple and secure manner.

In the arrangement according to the invention of at least one conduit, which is designed for carrying electrical current or electrical energy and is also referred to as a cable, on a housing part for a motor vehicle, in particular for an automobile such as, for example, a passenger car, at least one first longitudinal region of the conduit is accommodated in a corresponding recess of the housing part. A seal formed from an elastomer and thus also referred to as an elastomer seal or elastomer molded seal is held on the housing part, by means of which the housing part can be sealed against a corresponding housing element. At least one second longitudinal region of the seal extends over the first longitudinal region arranged in the recess and thus running in the recess or along the recess, as a result of which the first longitudinal region is fixed or held in the recess in a positive-locking manner.

The second longitudinal region extends, for example, obliquely or perpendicularly to the first longitudinal region, such that, for example, the second longitudinal region crosses or traverses the first longitudinal region. As a result, the first longitudinal region arranged in the recess is or can be supported on the second longitudinal region, such that the first longitudinal region cannot fall out of the recess. In this way, the first longitudinal region is fixed in the recess in a positive-locking manner and thus held on the housing part.

The invention enables a process-reliable fixing of the conduit, which is designed, for example, as a cable or cable duct, by a form fit which can be or is effected by means of the elastomer molded seal. This means that the previous and following statements concerning the conduit can also be readily applied to a cable duct for guiding at least one cable or at least one conduit, and vice versa. According to the invention, the seal has a dual function, such that the cable can be fixed to the housing part with only a small number of parts and thus at low cost and weight. A first function of the seal is to seal the housing part against the housing element. A second function of the seal is to fix the first longitudinal region in the recess in a positive-locking manner. In particular, the seal can be used as an assembly aid, for example, to prevent the first longitudinal region or the conduit from falling out of the recess during assembly by means of the seal, in particular by means of the second longitudinal region. In the course of assembly, the housing part is mounted on the housing element, for example, in particular while the seal and the conduit are held on the housing part. If, during assembly, the housing part is moved relative to the housing element and, in the process, pivoted, for example, by at least or exactly 180 degrees around a pivot axis, the second longitudinal region prevents, in a positive-locking manner, the first longitudinal region from falling out of the recess. As a result, the seal enables the housing part to be mounted on the housing elements in a particularly simple and thus time- and cost-efficient manner. In particular, the invention makes it possible to avoid the need for additional, separate aids such as adhesive strips for fixing the first longitudinal region and the recess, since the conduit is now fixed by means of the seal in accordance with the invention.

The invention is based on the assumption that it is possible in principle to fix the first longitudinal region of the conduit in the recess by means of at least one or more additional adhesive strips. For this purpose, for example, the adhesive strips are adhered to the housing part in such a way that the adhesive strips run over the recess and thus over the first longitudinal region arranged in the recess. If the adhesive strips are not adhered to the housing part, for example, because they are forgotten by a person carrying out the assembly, the seal is not fixed in the recess and can fall out of the recess during assembly. As a result, the assembly has to be interrupted and then started all over again. In contrast, the invention enables a particularly high level of process reliability when carrying out the assembly, since the seal is used on the one hand to seal the housing part against the housing element and on the other hand to fix the conduit in the recess. If the seal is thus mounted on the housing part, it is simultaneously possible to fix the conduit in the recess by means of the seal previously mounted on the housing part when the conduit is laid. The seal thus not only has a sealing function for sealing the housing part against the housing element, but the seal also has a mounting function in order to mount the conduit on the housing part particularly easily.

Further advantages, features and details of the invention emerge from the following description of a preferred exemplary embodiment and from the drawings. The features and combinations of features mentioned above in the description, and the features and combinations of features mentioned below in the description of figures and/or shown in the figures alone, can be used not only in the combination indicated in each case, but also in other combinations or on their own, without departing from the scope of the invention.

DETAILED DESCRIPTION OF THE DRAWINGS

Figure 1:
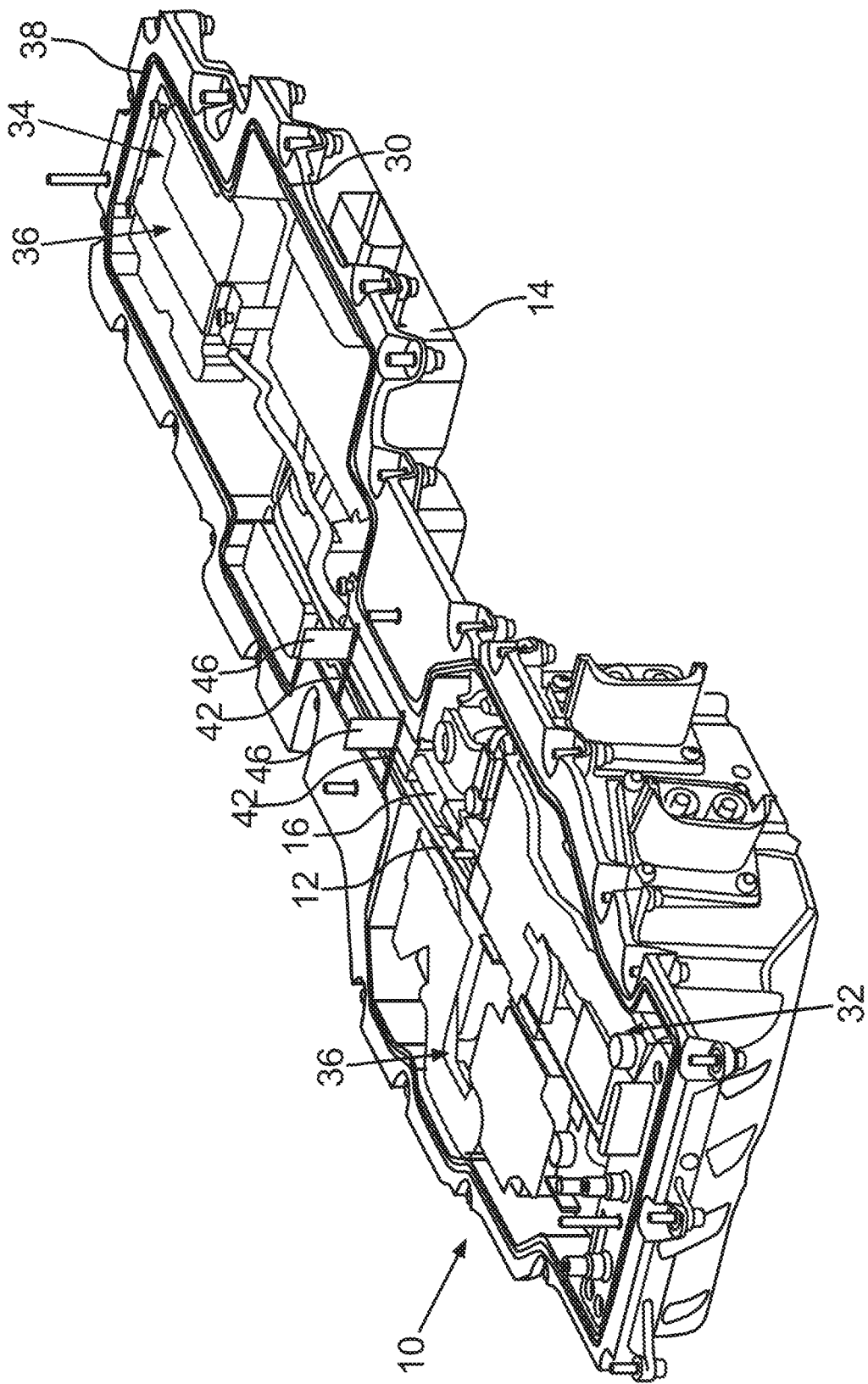
FIG. 1 is a schematic perspective view of an arrangement of conduits on a housing part for a motor vehicle according to the invention.

In the figures, identical or functionally identical elements are provided with identical reference numerals.

Figure 4:
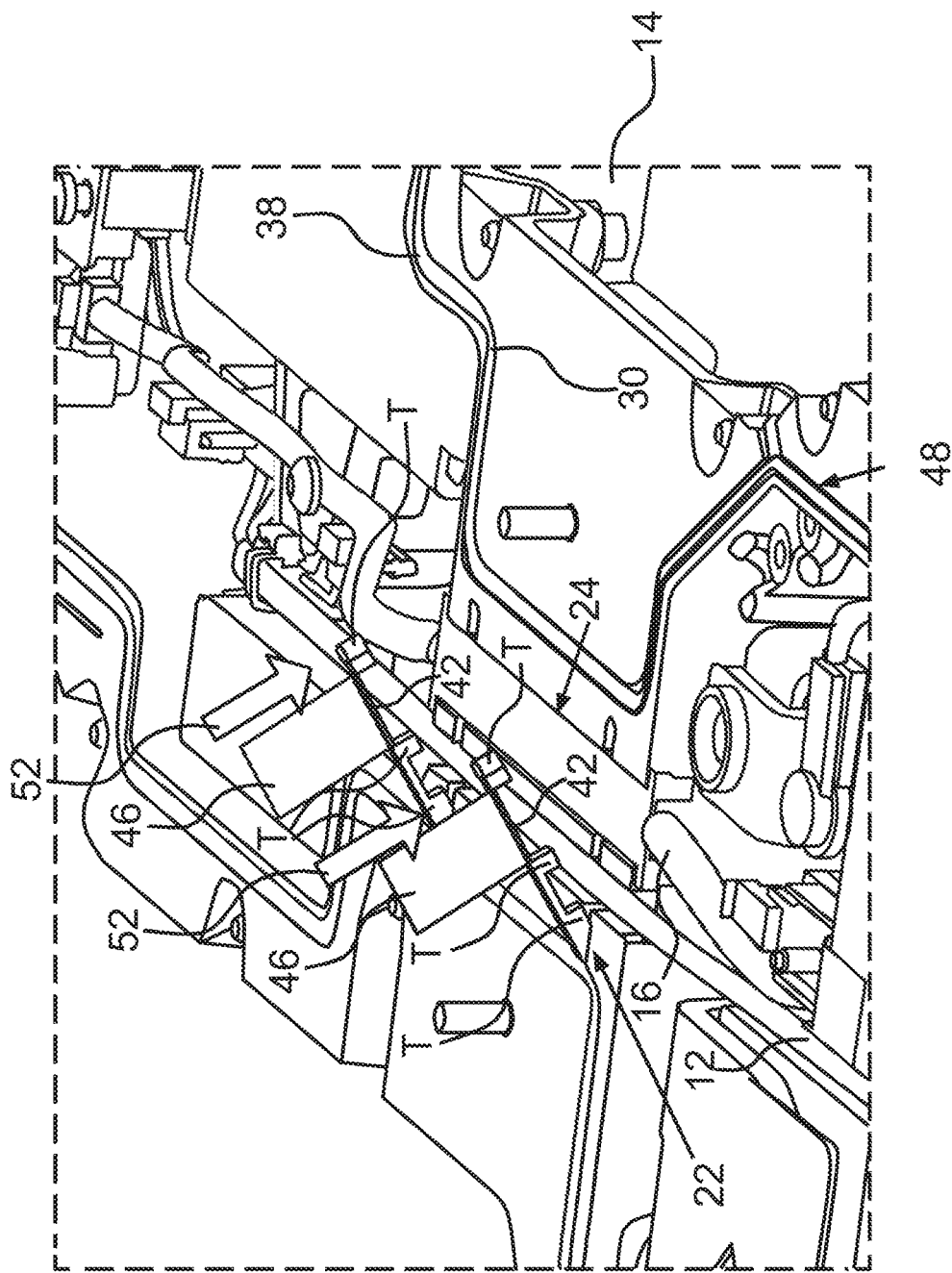
FIG. 4 is a further schematic perspective view of the housing part in sections.
Figure 5:
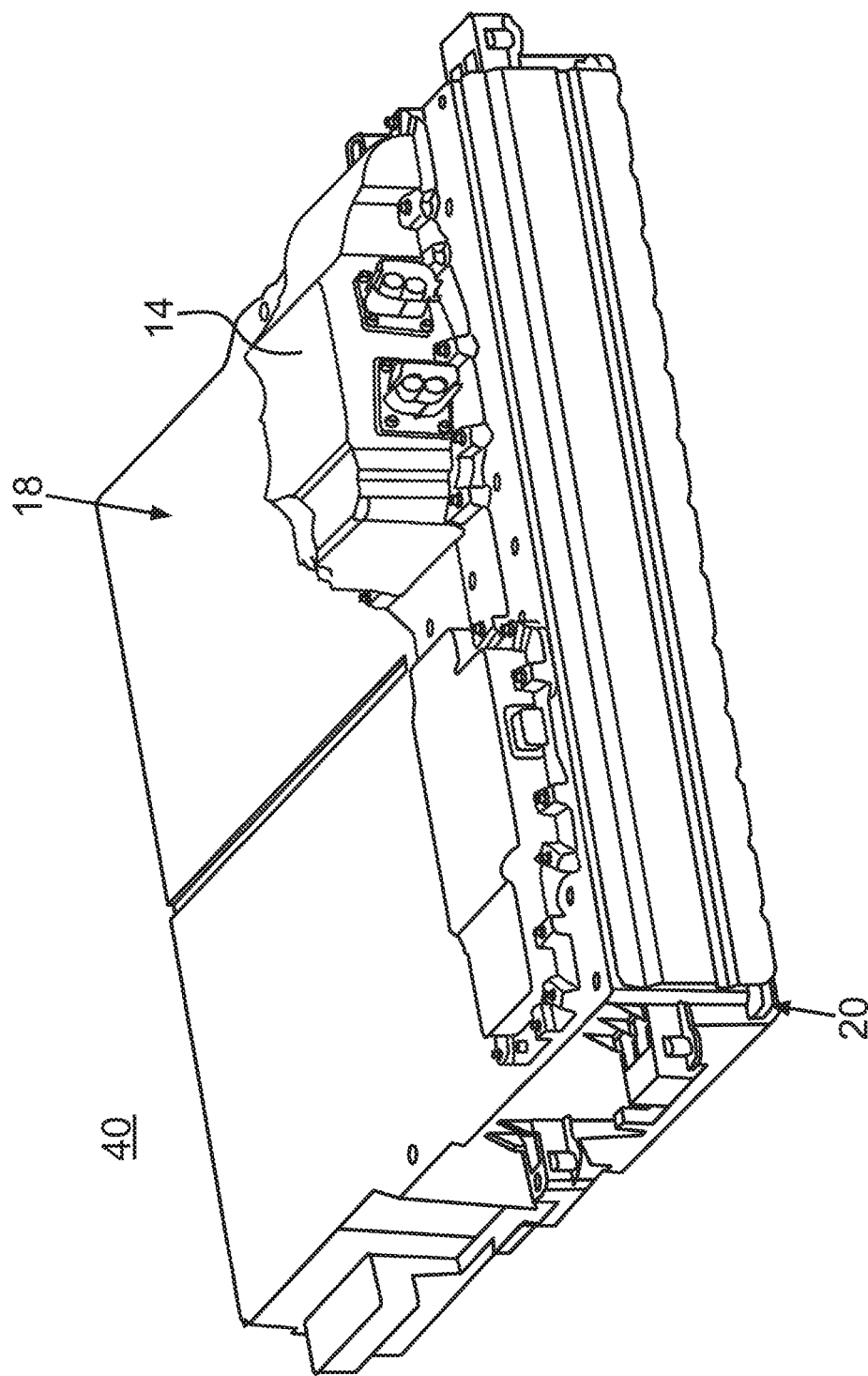
FIG. 5 is a schematic perspective view of an energy storage device for the motor vehicle designed to store electrical energy and comprising the arrangement and thus the housing part.

FIG. 1 shows, in a schematic perspective view, an arrangement 10 of a conduit 12 designed to carry electric current or electrical energy on a housing part 14 for a motor vehicle. The feature that the conduit 12 is designed to carry electric current is to be understood to mean that electric current can flow through the conduit 12, which is also referred to as a cable. In the arrangement 10, at least one further conduit 16, which is designed to carry electric current or electrical energy and which can be seen in particular from FIG. 4, is also arranged on the housing part 14. The aforementioned motor vehicle is designed, for example, as an automobile, in particular as a passenger car, and in its completely manufactured state comprises the arrangement 10 and thus the conduits 12 and 16 and the housing part 14. The motor vehicle is designed, for example, as a hybrid vehicle or else as an electric vehicle, in particular as a battery-electric vehicle, and thus in its completely manufactured state comprises at least one electric machine by means of which the motor vehicle can be driven electrically. To drive the motor vehicle electrically, the electric machine is supplied with electrical energy or electrical current. For this purpose, the motor vehicle in its fully manufactured state comprises, for example, at least or exactly one energy storage device 18 shown in a schematic perspective view in FIG. 5, by means of which electrical energy or electrical current can be stored. The energy storage device 18 is a high-voltage component and consequently has an electrical voltage, in particular an electrical operating voltage, which is more than 50 volts and is preferably several hundred volts. This makes it possible to implement particularly large electrical conduits for electrically driving the motor vehicle. Thus, in order to operate the electric machine in its engine mode, the electric machine is supplied with electrical energy stored in the energy storage device 18. By way of example, the energy storage device 18 is designed as a high-voltage battery (HV battery).

The energy storage device 18 comprises the housing part 14 and a further housing element 20 corresponding thereto, in which, for example, a plurality of electrically interconnected storage cells for storing the electrical energy are arranged. In the completely manufactured state of the energy storage device 18, the housing part 14 is connected to the housing element 20. It can be seen particularly well from FIGS. 1, 3 and 4 that, in the arrangement 10, a respective first longitudinal region 22 or 24 of the respective conduit 12 or 16 is accommodated in a respective corresponding recess 26 or 28 of the housing part 14. The housing part 14 is formed, for example, as a die-cast aluminium part and directly delimits the recess 26 and 28, such that, for example, the longitudinal regions 22 and 24 accommodated in the recess 26 and 28 directly contact the housing part 14. It can be seen particularly well from FIG. 2 that the recesses 26 and 28 are formed as grooves of the housing part 14, wherein the recesses 26 and 28 each have a longitudinal extension direction and thus extend longitudinally or in a straight line. The longitudinal extension directions of the recesses 26 and 28 or the recesses 26 and 28 run in parallel to each other.

Furthermore, the arrangement 10 holds a seal 30, which is preferably formed in one piece and is formed from an elastomer, by means of which seal the housing part 14 can be or is sealed against the corresponding housing element 20. In other words, in the completely manufactured state of the energy storage device 18, the housing part 14 and the housing element 20 are connected to one another, wherein the housing part 14 is sealed against the housing element 20 by means of the seal 30.

Figure 3:
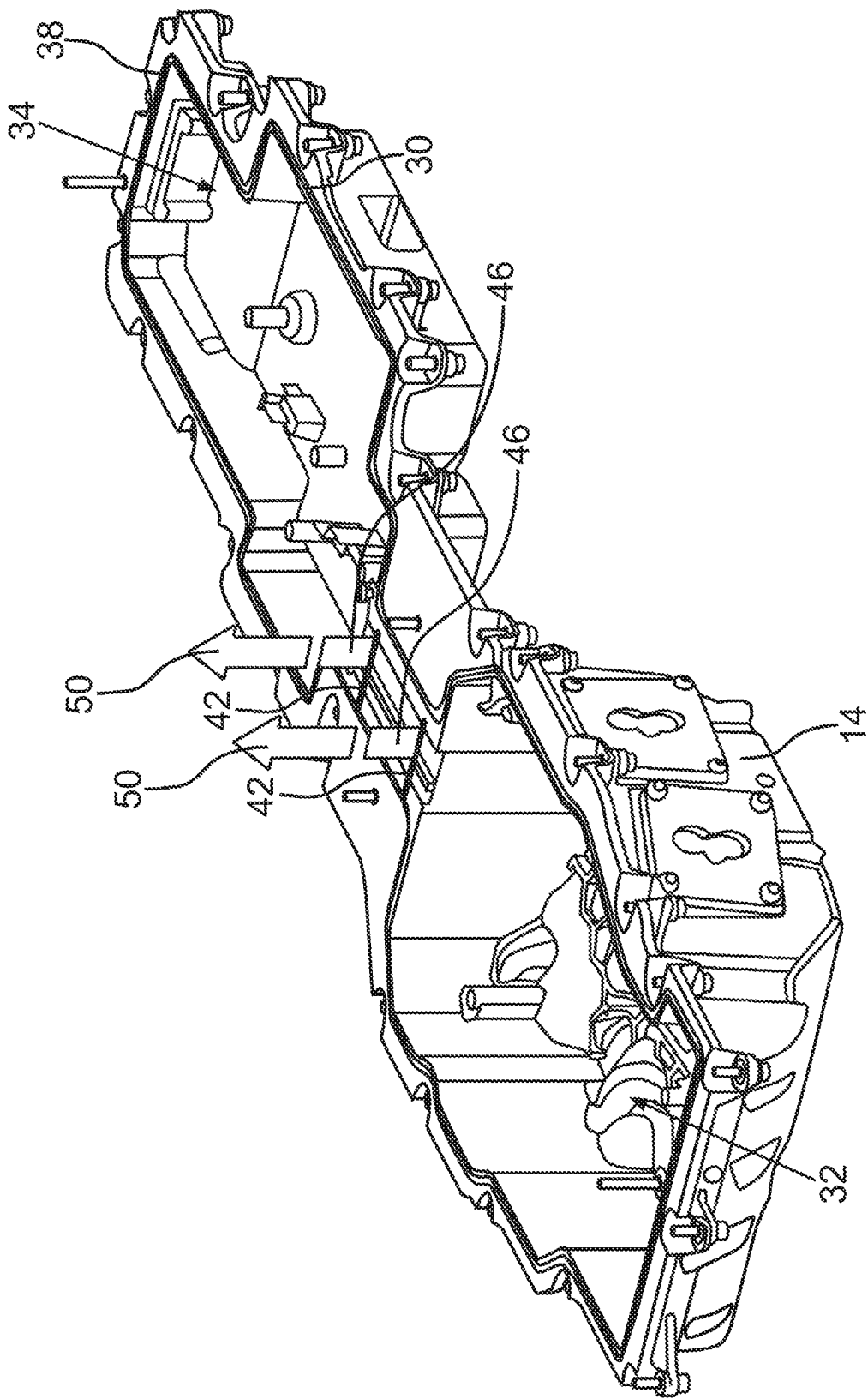
FIG. 3 is a schematic perspective view of the housing part.

It can be seen particularly well from FIGS. 1 and 3 that the housing part 14 delimits receiving regions 32 and 34, which are also referred to as compartments. The receiving regions 32 and 34 receive respective electrical or electronic components 36 (FIG. 1), in particular of the energy storage device 18. The receiving regions 32 and 34 per se are open towards the housing element 20 and are closed by means of the housing element 20, for example. Here, the seal 30 has a longitudinal region 38, which extends completely around the receiving regions 32 and 34. In this way, the receiving regions 32 and 34 can be sealed particularly well against an environment 40 of the energy storage device 18, such that, for example, moisture can be prevented from entering the receiving regions 32 and 34.

It can be seen particularly well from FIGS. 3 and 4 that respective longitudinal regions 42 of the seal 30 branch off from the longitudinal region 38 of the seal 30, wherein the longitudinal regions 42 run obliquely or perpendicularly to the longitudinal region 38 or to at least a part of the longitudinal region 38. The longitudinal regions 42 are formed integrally with each other and integrally with the longitudinal region 38, such that the longitudinal regions 42 are components of the seal 30. The longitudinal regions 42 extend over the recesses 26 and 28 and over the longitudinal regions 22 and 24 of the conduits 12 and 16 arranged in the recesses 26 and 28, whereby the longitudinal regions 22 and 24 are held in the recesses 26 and 28 in a positive-locking manner and are thus fixed. Respective parts T of the respective longitudinal region 42 which follow one another in the longitudinal extension direction of the respective longitudinal region 42 and are spaced apart from one another, for example, are at least partially accommodated in the respective further recesses 44 (FIG. 2) of the housing part 14 and are thereby held or fixed to the housing part 14. Here, the respective recess 26 or 28 is connected to the respective recesses 44, in particular fluidically, such that the recesses 26 and 44 or 28 and 44 merge into one another, in particular without interruption or continuously.

In addition, at least or exactly one tab 46 projecting from the seal 30, in particular from the respective longitudinal region 42, is provided on the seal 30, by means of which the respective second longitudinal region 42 can be pulled away from the respective recess 26 or 28 and thus from the housing part 14 manually and thus, for example, by a person. The tabs 46 are thereby formed integrally with the seal 30, such that the seal 30 also forms the tabs 46.

Figure 2:
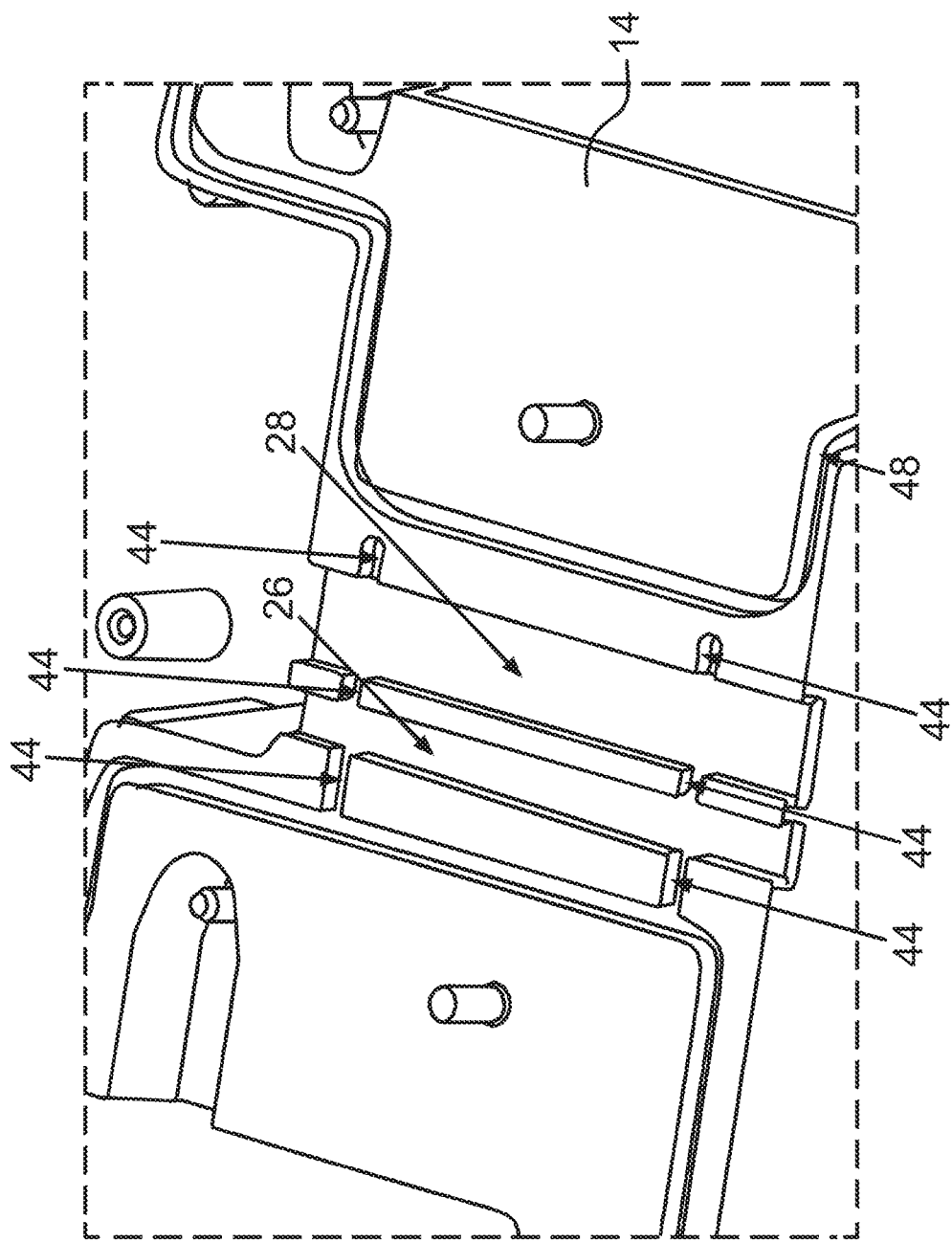
FIG. 2 is a schematic and perspective plan view of the housing part in sections.

In addition, the housing part 14 has a receptacle 48, which can be seen in part from FIG. 2 and is formed as a groove, which extends in particular completely peripherally around the receiving regions 32 and 34. The longitudinal region 38 of the seal 30 is received in the receptacle 48 and is thereby held on the housing part 14. The housing part 14 and thus the recesses 26, 28 and 44 and the receptacle 48 are produced by casting, in particular by die casting. After the housing part 14 itself has been manufactured, for example, the seal 30 is mounted on the manufactured housing part 14 in such a way that the longitudinal region 38 is arranged in the receptacle 48 and the longitudinal regions 42 are arranged in the recesses 44. This can be seen in FIG. 3. In other words, FIG. 3 shows a state in which the conduits 12 and 16 are not yet mounted on the housing part 14, wherein in the mentioned state, the seal 30 is mounted on the housing part 14 and thus held in such a way that the longitudinal region 38 is arranged in the receptacle 48 and the longitudinal regions 42 are arranged in the recesses 44. In this state, for example, the housing part 14 with the seal 30 mounted thereon is delivered to a work station or an assembly wall. The receptacle 48, which is formed as a groove, for example, is arranged in a so-called sealing region, since the receptacle 48 and the longitudinal region 38 are used to seal the housing part 14 against the housing element 20.

Starting from the state shown in FIG. 3, for example, a person carries out an assembly in the course of which the conduits 12 and 16 are mounted on the housing part 14 and are laid in the recesses 26 and 28 in the process. For this purpose, for example, the person grasps or grips around the tabs 46 with his/her hand or hands and exerts on the tabs 46 a respective tensile force illustrated in FIG. 3 by a respective arrow 50. In this way, the tabs 46 and, via them, the longitudinal regions 42 are pulled away from the housing part 14, in particular in such a way that the parts T are pulled out of the corresponding recesses 44. In this way, the longitudinal regions 42 are moved relative to the housing part 14, for example, in such a way that the longitudinal regions 42 clear the recesses 26 and 28, i.e., the recesses 26 and 28 are no longer spanned by the longitudinal regions 42. As a result, the conduits 12 and 16 can be laid and arranged on the housing member 14 in such a way that the longitudinal regions 22 and 24 are arranged in the recesses 26 and 28. In other words, the conduits 12 and 16 are inserted into the recesses 26 and 28. Thereupon, as illustrated in FIG. 4 by arrows 52, the longitudinal regions 42 are moved by the person relative to the housing part 14, in particular via the tabs 46, in such a way that the longitudinal regions 42 again extend over the recesses 26 and 28. In particular, the parts T are arranged in the recesses 44 by, for example, pressing the parts T into the recess 44. Then, the longitudinal regions 42 extend over the recesses 26 and 28 and over the longitudinal regions 22 and 24 arranged in the recesses 26 and 28.

The longitudinal regions 42 each have a further longitudinal extension direction, which runs obliquely or presently perpendicularly to the respective longitudinal extension direction of the respective recess 26 or 28. Thus, the longitudinal regions 42 cross or traverse the recesses 26 and 28. As a result, the longitudinal regions 22 and 24 are covered by the longitudinal regions 42 in a direction pointing away from the housing part 14, whereby the longitudinal regions 22 and 24 can be or are supported on the longitudinal regions 42 in the direction. As a result, the longitudinal regions 22 and 24 are fixed in a positive-locking manner and thus held in the recesses 26 and 28. If, for example, the housing part 14 with the seal 30 held thereon and with the conduits 12 and 16 held thereon is pivoted, for example, by 180 degrees in such a way that the aforementioned direction points downwards in the vertical direction, the longitudinal regions 42 crossing or spanning the recesses 26 and 28 and thus the longitudinal regions 22 and 24 prevent the conduits 12 and 16 from falling out of the recesses 26 and 28 downwards in the vertical direction. As a result, the housing part 14 with the conduits 12 and 16 held thereon can be particularly easily placed on the housing element 20 in a vertical direction from top to bottom and finally connected to the housing element 20 without the conduits 12 and 16 falling out of the recesses 26 and 28 in the process.

The tabs 46, which project and thus protrude from the longitudinal regions 42, can be pressed into any position, since they, like the seal 30 and the longitudinal regions 38 and 42, respectively, are formed from the aforementioned elastomer and are thus flexible, i.e., elastically deformable or bendable. In this way, it can be avoided that the tabs 46 impair the connection between the housing part 14 and the housing element 20 or the desired sealing.

LIST OF REFERENCE CHARACTERS 10 arrangement
12 conduit
14 housing part
16 conduit
18 energy storage device
20 housing element
22 longitudinal region
24 longitudinal region
26 recess
28 recess
30 seal
32 receiving region
34 receiving region
36 components
38 longitudinal region
40 environment
42 longitudinal region
44 recess
46 tab
48 receptacle
50 arrow
52 arrow
T part

What is claimed is:

1. An arrangement (10), comprising:
a housing part (14) for a motor vehicle;
a conduit (12), designed to carry electric current, disposed on the housing part (14);
wherein a first longitudinal region (22) of the conduit (12) is disposed in a first recess (26) of the housing part (14); and
a seal (30) formed from an elastomer, wherein the seal (30) is held on the housing part (14) and wherein via the seal (30) the housing part (14) is sealable against a housing element (20);
wherein a second longitudinal region (42) of the seal (30) extends over the first longitudinal region (22) of the conduit (12) such that the first longitudinal region (22) is fixed in a positive-locking manner in the first recess (26).

2. The arrangement (10) according to claim 1, wherein at least one part (T) of the second longitudinal region (42) is at least partially accommodated in a second recess (44) of the housing part (14).

3. The arrangement (10) according to claim 2, wherein the first recess (26) and the second recess (44) are intrinsically connected to each other.

4. The arrangement (10) according to claim 2, wherein the seal (30) has a tab (46) projecting from the seal (30) and wherein via the tab (46) the second longitudinal region (42) of the seal (30) is pullable manually away from the recess (26).

5. The arrangement (10) according to claim 4, wherein the tab (46) is formed integrally with the seal (30).

* * * * *